US 8,856,394 B2

(12) United States Patent
Moehring (10) Patent No.: US 8,856,394 B2
(45) Date of Patent: Oct. 7, 2014

(54) METHOD AND APPARATUS FOR A DOCKABLE DISPLAY MODULE

(75) Inventor: Chris Moehring, Tomball, TX (US)

(73) Assignee: QUALCOMM Incorporated, San Diego, CA (US)

( * ) Notice: Subject to any disclaimer, the term of this patent is extended or adjusted under 35 U.S.C. 154(b) by 2268 days.

(21) Appl. No.: 11/799,216

(22) Filed: Apr. 30, 2007

(65) Prior Publication Data

US 2008/0266205 A1   Oct. 30, 2008

(51) Int. Cl.
  G06F 3/00 (2006.01)
  H04M 1/725 (2006.01)
  G06F 1/16 (2006.01)
  H04M 1/02 (2006.01)

(52) U.S. Cl.
  CPC ........... *H04M 1/7253* (2013.01); *G06F 1/1613* (2013.01); *H04M 1/72547* (2013.01); *G06F 1/1647* (2013.01); *H04M 1/0256* (2013.01); *G06F 1/1654* (2013.01); *G06F 1/1632* (2013.01)
  USPC ................................................. 710/15; 710/8

(58) Field of Classification Search
  USPC .......................................... 710/8, 15; 7/8, 15
  See application file for complete search history.

(56) References Cited

U.S. PATENT DOCUMENTS

| 6,115,618 | A | * | 9/2000 | Lebby et al. .................. 455/566 |
| 6,266,539 | B1 | * | 7/2001 | Pardo .......................... 455/556.2 |
| 6,961,237 | B2 | * | 11/2005 | Dickie ...................... 361/679.04 |
| 7,047,339 | B2 | | 5/2006 | Oakley |
| 7,831,276 | B2 | * | 11/2010 | Kumar ........................ 455/556.1 |
| 2002/0032386 | A1 | | 3/2002 | Sackner et al. |
| 2002/0107800 | A1 | | 8/2002 | Kadawaki et al. |
| 2004/0172481 | A1 | * | 9/2004 | Engstrom ..................... 709/239 |
| 2004/0266480 | A1 | | 12/2004 | Hjelt et al. |
| 2005/0066006 | A1 | | 3/2005 | Fleck et al. |
| 2006/0123053 | A1 | * | 6/2006 | Scannell .................... 707/104.1 |
| 2006/0155914 | A1 | * | 7/2006 | Jobs et al. ...................... 711/100 |
| 2007/0086724 | A1 | * | 4/2007 | Grady et al. .................... 386/46 |

FOREIGN PATENT DOCUMENTS

| CN | 1313968 A | 9/2001 |
| TW | M275445 U | 9/2005 |
| WO | WO-0060450 A1 | 10/2000 |
| WO | WO-2008136937 A2 | 11/2008 |

OTHER PUBLICATIONS

Office Action, Application No. TW 97115007, Date of Issuance: Sep. 14, 2013, pp. 1-7.
Taiwan Search Report—TW097115007—TIPO—Mar. 27, 2014.

* cited by examiner

*Primary Examiner* — Zachary K Huson
(74) *Attorney, Agent, or Firm* — Fulbright & Jaworski LLP (57) ABSTRACT

An electronic device comprising a plurality of onboard displays, wherein at least one of the onboard displays is removable from the electronic device, and wherein the at least one of the onboard displays aggregates and displays information received from a plurality of electronic devices.

24 Claims, 6 Drawing Sheets

METHOD AND APPARATUS FOR A DOCKABLE DISPLAY MODULE

BACKGROUND

Although much smaller in form factor than a desktop computer, laptop computers and personal digital assistants (PDAs) can have drawbacks. For example, individuals sometimes find themselves in a quandary when they forget to look up a specific piece of information but have already shut down the laptop computer or PDA. The only way to retrieve the information is to boot up the entire system, which takes time. Moreover, many individuals end up carrying a variety of devices, each of them incompatible with each other and each providing different sets of information, which is cumbersome.

DETAILED DESCRIPTION OF THE DRAWINGS

Figure 1:
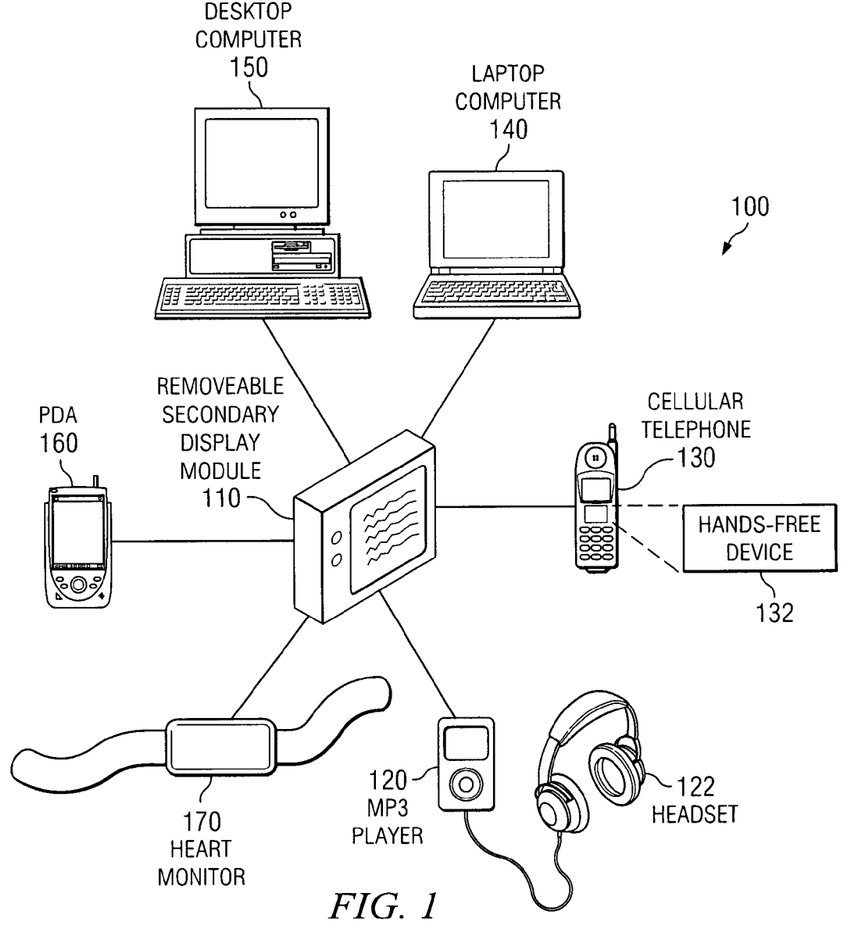
FIG. 1 depicts electronic devices in which embodiments of a removable secondary display module can be implemented.

FIG. 1 depicts electronic devices 100 in which embodiments of a removable secondary display module 110 can be implemented. Removable secondary display module 110 is an electronic device configured to dock with, communicate with, and present display information from one or more of electronic devices 100. In the illustrated embodiment, electronic devices 100 comprise a MP3 player 120, a cellular telephone 130, a laptop computer 140, a desktop computer 150, a personal digital assistant (PDA) 160, and a heart monitor 170. However, it should be noted that electronic devices 100 may be embodied as any other type of electronic device, such as, but not limited to, a gaming device, a global positioning system (GPS), a remote control, a television set, another type of medical monitoring device (e.g., glucose level monitoring device), or a camera.

In the embodiment illustrated, removable secondary display module 110 can use any type of communications protocol to communicate with electronic devices 100, such as, but not limited to, infrared, radio frequency, Bluetooth®, Wi-Fi®, and ultrawide band. (Bluetooth® is a registered trademark of Bluetooth Sig, Inc. in the United States of America and possibly other countries. Wi-Fi® is a registered trademark of the Wi-Fi Alliance in the United States and possibly other countries.) Furthermore, removable secondary display module 110 identifies which electronic devices 100 to communicate with using an enumeration process. An enumeration registration process pairs each of electronic devices 100 with removable secondary display module 110. In essence, removable secondary display module 110 maintains a list of identification tags for each of electronic devices 100. Alternatively, each of electronic devices 100 can store the identification tag for removable secondary display module 110 in a memory for the corresponding electronic devices 100. It should be noted, however, that removable secondary display module 110 can identify which electronic devices to communicate using any other type of registration process.

In the illustrative embodiment, MP3 player 120 acts as a proxy and collects information regarding the operating parameters of a headset 122. Similarly, cellular telephone 130 can act as a proxy and collect information regarding the operating parameters of a hands-free device 132. An operating parameter is a performance characteristic representing the state of operation of a device. Example operating parameters comprise, but are not limited to, battery life, signal strength, Central Processing Unit (CPU) usage, available memory, operating temperature, and the existence of any connection errors. Thus, when acting as a proxy, MP3 player 120 and cellular telephone 130 collects and/or transmits information to removable secondary display module 110 on behalf of headset 122 and hands-free device 132, respectively.

Figure 2A:
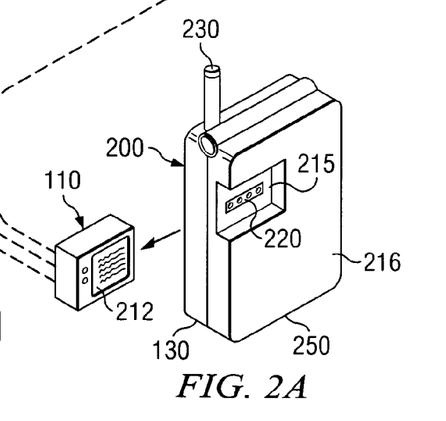
FIGS. 2A through 2E illustrate an embodiment of an electronic device having a removable secondary display module configured to fit into different types of electronic devices.
Figure 2B:
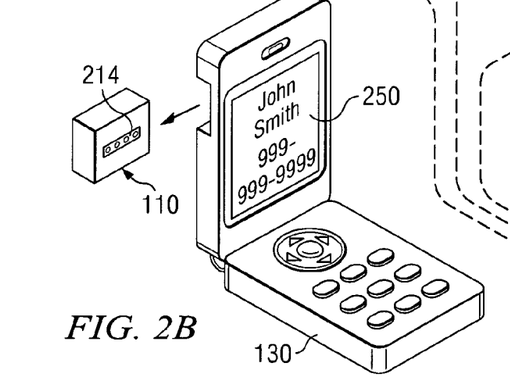

FIGS. 2A through 2E illustrate an embodiment of electronic devices 100 having removable secondary display module 110 configured to fit into different types of electronic devices 100. Referring to FIGS. 2A and 2B, electronic device 100 is in the form of cellular telephone 130. However, it should be noted that the features and/or functions described in connection with FIGS. 2A and 2B can be embodied in any of electronic devices 100. FIG. 2A is an external view of cellular telephone 130, while FIG. 2B illustrates an internal view or a view of cellular telephone 130 in an open position. Cellular telephone 130 comprises a removable secondary display module 110, a connector 220, an antenna 230, and a display unit 250. Cellular telephone 130 is configured to display information on both removable secondary display module 110 and display unit 250. Removable secondary display module 110 and display unit 250 are onboard displays for cellular telephone 130. An onboard display is a display module or display unit configured to be located on, built into, and/or otherwise form a part of the electronic device.

Removable secondary display module 110 comprises display unit 212 and a connector 214. In the illustrative embodiment, removable secondary display module 110 is an electronic device configured to present display information to a user. In some embodiments, the information is a subset of information such as a portion, part of, summary, or condensed version of the information stored and received by cellular telephone 130. In other embodiments, the information is a set of at-a-glance information or information that a user can view, analyze, and comprehend in a short period of time. The information may comprise any type of information including, but not limited to, a summary of the activities recorded in cellular telephone 130, the battery status of cellular telephone 130, any calendar or system alerts, a list of missed calls, or a list of headline news.

In the illustrative embodiment, display units 212 and 250 can present different information or similar information in a similar or in a different format. For example, display unit 250 can present all or substantially all received electronic mail (email) messages, including the content of each email. On the other hand, display unit 212 may instead present the total number of received email messages, including the number of unread, read, and deleted email messages. In another example, display unit 250 may present the entire or a substantial portion of calendar and meetings stored on the calendar. On the other hand, display unit 212 may instead present the next meeting listed in the calendar. Thus, in essence, display unit 212 presents a subset or a condensed version of the information that is presented in display unit 250. However, in an alternate embodiment, display unit 212 and display unit 250 can present the same or a subset of the same information in the same format.

In the embodiment illustrated, removable secondary display module 110 polls cellular telephone 130, or, in other words, initiates a request, for new or updated display information. In another embodiment, cellular telephone 130 creates an event indicating that new or updated display information is available. An event is a software protocol indicating that particular activity is occurring, such as the appearance of a particular file or folder, a keyboard or mouse operation, or a timed activity. In this embodiment, the particular activity is the availability of information for removable secondary display module 110. In response to receiving an event from cellular telephone 130, removable secondary display module 110 initiates a request for the information. Cellular telephone 130 subsequently transmits the information. In some embodiments, the transfer of information from cellular telephone 130 to removable secondary display module 110 may be automatic (e.g. as new and/or updated information is available). Removable secondary display module 110 is configured to present, receive, and/or aggregate the even if cellular telephone 130 is turned off.

In the illustrative embodiment, removable secondary display module 110 is insertable into a cavity 215 in a housing 216 of cellular telephone 130. When inserted in cavity 215, at least a portion of removable secondary display module 110 is disposed along and/or within a periphery of cellular telephone 130. The periphery is the external or outside surface of housing 216 of cellular telephone 130. Removable secondary display module 110 is configured such that a user can connect and disconnect removable secondary display module 110 from cellular telephone 130. Connectors 214 and 220 communicatively couple removable secondary display module 110 to cellular telephone 130. Thus, removable secondary display module 110 enables cellular telephone 130 to upload information, download information, or recharge a battery internal to removable secondary display module 110. Removable secondary display module 110 can be releasably secured to housing 216 using a variety of different methods or devices, such as, but not limited to, a clip, frictional engagement, locking tab, or other similar device.

It should be understood that removable secondary display module 110 is not limited to the size and shape of the illustrated example. In some embodiments, removable secondary display module 110 is dimensionally smaller than cellular telephone 130. For example, removable secondary display module 110 may be dimensioned such that a user can easily carry and transport removable secondary display module 110 (e.g., the size of a credit card or any other similar device).

Antenna 230 transmits and receives wireless communication signals to and from cellular telephone 130 and/or other wireless devices (e.g. electronic devices 100). Antenna 230 enables cellular telephone 130 to communicate with other electronic devices, and in some embodiments, removable secondary display module 110. In this embodiment, removable secondary display module 110 comprises an internal antenna which transmits and receives requests and information from cellular telephone 130. In other embodiments, removable secondary display module 110 is a static device and/or without wireless capability and displays information that was stored to a memory of removable secondary display module 110 when removable secondary display module 110 was last docketed to cellular telephone 130.

In the illustrative embodiment, removable secondary display unit 210 can receive information from cellular telephone 130 as well as other electronic devices 100. In the illustrative embodiment, removable secondary display unit 210 receives and transmits requests for information independently of cellular telephone 130. Alternatively, removable secondary display unit 210 can receive and transmit requests using cellular telephone 130 as a proxy. Thus, in this embodiment, all information transmitted by electronic devices 100 are received by cellular telephone 130 and then subsequently transmitted to removable secondary display unit 210. Likewise, any requests for information is initiated by removable secondary display unit 210 and sent to cellular telephone 130. Cellular telephone subsequently transmits the request to the appropriate electronic devices 100.

Figures 2C, 2D, 2E:
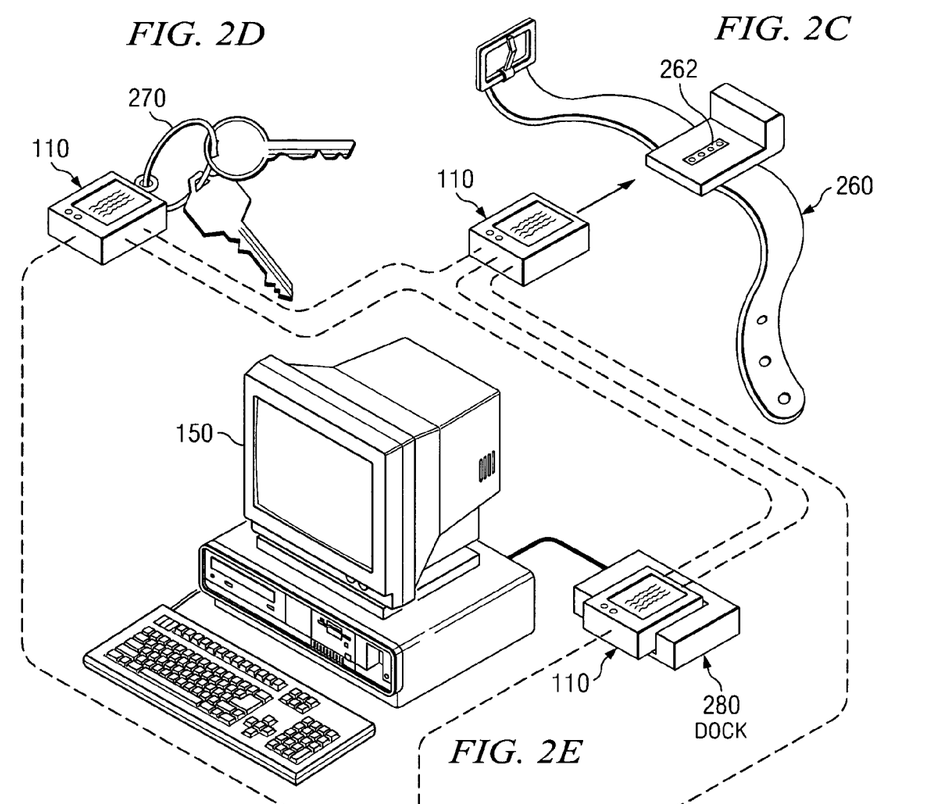

FIGS. 2C through 2E depict an embodiment of removable secondary display module 110 configured to dock with different types of electronic devices 100. In the illustrative embodiments, removable secondary display module 110 can communicate directly with electronic device 100 with which removable secondary display module 110 is docked. Removable secondary display module 110 can also recharge its internal power source when docked. FIG. 2C comprises removable secondary display module 110 and wrist device 260. FIG. 2D illustrates removable secondary display module 110 configured as a key fob. FIG. 2E depicts removable secondary display module 110 configured to interface with dock 280, which is connected to desktop computer 150.

Referring to FIG. 2C, in the illustrative embodiment, wrist device 260 comprises connector 262. Connector 262 is engageable with connector 214 (FIG. 2B), thereby enabling secondary display module 210 to be used as wrist device 260. Alternatively, removable secondary display module 110 can also be configured as a key fob, as illustrated in FIG. 6C. A key fob is an ornamental decoration or an attachment attached to a set of keys. An electronic key fob can comprise a set of buttons which control certain features in an automobile, such as a door lock, a door unlock, or a trunk open feature. Removable secondary display module 110 connects directly to key ring 270. In an alternative embodiment, removable secondary display module 110 can also connect to another electronic key fob and interact with the existing features within that electronic key fob.

Referring to FIG. 2E, removable secondary display module 110 can also be configured to slide into dock 280 connected to desktop computer 150. Dock 280 is a device that receives and transfers information to and from desktop computer 150. In this embodiment, removable secondary display module 110 is dynamic and continuously receives updated information (e.g. via wireless communications). However, in alternative embodiments, removable secondary display module 110 may be static or otherwise unable to receive wireless communication and, instead, receive updated information when removable secondary display module 110 is connected to dock 280.

Figure 3:
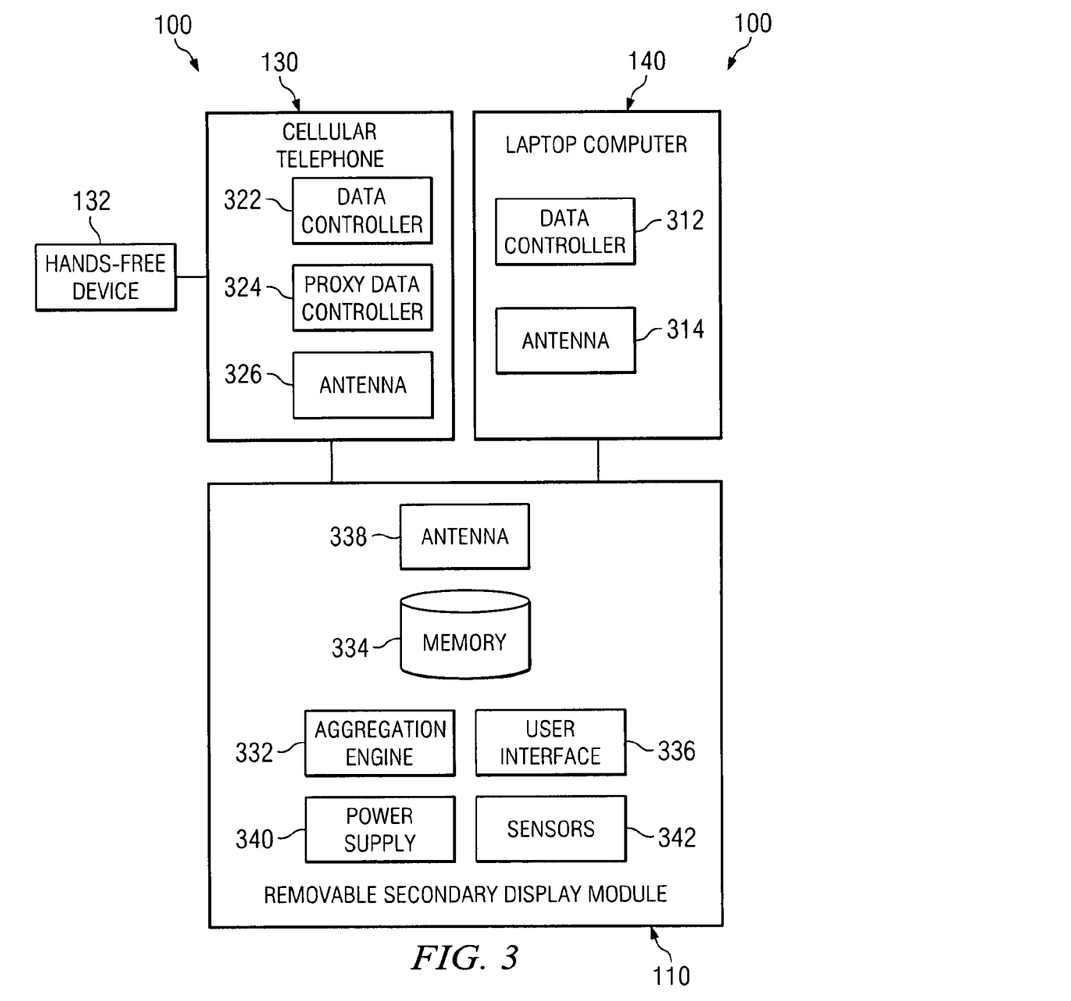
FIG. 3 is a block diagram of a network of electronic devices in which embodiments of a removable secondary display can be implemented.

FIG. 3 is a block diagram of a network of electronic devices 100 in which removable secondary display module 110 can be implemented. In the embodiment illustrated in FIG. 3, electronic devices 100 comprise cellular telephone 130, hands-free device 132, and laptop computer 140 which are communicatively connected to removable secondary display module 110 via network 100.

Laptop computer 140 comprises a data controller 312, which is a processing unit that executes a set of instructions for collecting, processing, and transmitting information to removable secondary display module 110 via an antenna 314. Cellular telephone 130 comprises a data controller 322 and a proxy data controller 324. Data controller 322 is similar to data controller 312 and collects, processes, and transmits information to removable secondary display module via an antenna 326. Proxy data controller 324 is a processing unit which manages the information for hands-free device 132, which is coupled to cellular telephone 130. Cellular telephone 130 acts a proxy for the information for hands-free device 132. Therefore, proxy data controller 324 gathers and subsequently transmits the information for hands-free device 132 to removable secondary display module 110.

In the illustrative embodiment, data controller 312, data controller 322, and proxy controller 324 attach an identifier, such as an XML or binary tag, to each type of information transmitted to removable secondary display module 110. For example, an XML tag may identify the information type as a <text message>, <voicemail message>, or <instant message>. In another embodiment, a binary tag may identify the information type with a specific series of 0's and 1's. The identifier enables removable secondary display module 110 to subsequently format and organize the information into a form presentable to a user.

Removable secondary display module 110 collects, receives, and/or processes information sent by laptop computer 140 and cellular telephone 130. Removable secondary display module 110 comprises an aggregation engine 332, a memory 334, display unit 212, an antenna 338, a power supply 340, and sensors 342. The components in removable secondary display module 110 are a combined hardware and software embodiment. However, in alternative embodiments, the components in removable secondary display module 110 can be a hardware-only or software-only embodiment.

Aggregation engine 332 is a processing unit which transmits requests and receives information from one or both laptop 140 and cellular telephone 130. Aggregation engine 332 organizes the received information using the data tag attached to the incoming information. In an alternative embodiment, aggregation engine 332 can also comprise a translator. Thus, aggregation engine 332 can receive incoming information in a variety of formats and then translate the information into one common format. Therefore, instead of requesting information in a particular format from laptop computer 140 and cellular telephone 130, aggregation engine 332 can accept and receive information from electronic devices 100 in any format.

In the illustrative embodiment, aggregation engine 332 polls laptop computer 140 and cellular telephone 130 for information. Alternatively, laptop computer 140 and cellular telephone 130 can create and transmit to removable secondary module 210 an event indicating that new and/or updated information is available. In response to receiving the event, aggregation engine 332 determines whether removable secondary display module 110 would like to receive the information from either laptop computer 140 and cellular telephone 130. If removable secondary display module 110 would like the information, aggregation engine 332 responds to the event and initiates a request for the information. Upon receipt of the updated information, aggregation engine 332 processes the information by reading the data tag, determining what type of data is included in the received information, organizing the data according to the user preferences or default settings, and configuring the data for display and to be automatically transmitted to display unit 212.

In the illustrative embodiment, aggregation engine 332 determines what type of information to request and the frequency with which to request the information based on either the default settings or user preferences stored in memory 334. The default settings can be provided by an administrator or the manufacturer of the electronic device. The user can change the default settings through display unit 212. Additionally, aggregation engine 332 stores the information in memory 334 for a predetermined amount of time before purging and/or deleting all or a portion of the information. The predetermined amount of time can be a default setting or established by the user.

Upon receipt of the information, aggregation engine 332 determines whether the same information has already been provided by another electronic device. For example, in certain circumstances, laptop computer 140 and cellular telephone 130 may receive the same email message. However, instead of presenting the information multiple times, removable secondary display module 110 would present the email message to the user once. Aggregation engine 332 uses the data tags and subject lines to determine whether the received information is a duplicate. Thus, in this example, if the email message includes the same type of data tag and the same subject line, then aggregation engine 332 concludes that the two email messages are duplicates. Aggregation engine 332 would then review the time stamp associated with each email message and identify the email message with the earliest time stamp. Aggregation engine 332 would present the email message with the earliest time stamp and delete the other copy of the email message.

Aggregation engine 332 connects to memory 334, display unit 212, antenna 338, power supply 330, and sensors 342. Memory 334 is a memory element that stores the information to be presented to a user. Display unit 212 may also be coupled to other devices (e.g., a keyboard, mouse, or joystick). Antenna 338 enables removable secondary display module 110 to wirelessly receive and transmit requests for information using any wireless transfer protocols. Power supply 340 is a battery or any other type of power supplying device (e.g., a cable connected to an electrical outlet, an external battery, etc.) and enables removable secondary display module 110 to present the information and/or continue to receive or aggregate information even if cellular telephone 130 is powered off. Sensors 342 are coupled to an audio or vibration system so that removable secondary display module 110 can emanate a sound or vibrate when a specific piece of information is received. In some embodiments, removable secondary display module 110 may be configured without power supply 340 and/or sensors 342.

Thus, in use, aggregation engine 332 collects and organizes the information to be presented on display unit 212. Prior to collecting the information, aggregation engine 332 determines the type of information to collect. The type of information is determined either by the user or is a default setting. After aggregation engine 332 determines what information to collect, aggregation engine 332 sends a request to laptop computer 140 and/or cellular telephone 130 for new and/or updated information. Aggregation engine 332 then receives the information and stores the information in memory 334. Depending on the type of information requested and gathered, aggregation engine 332 summarizes the information. Aggregation engine 332 then parses through the received information, reads the data tags associated with the information, organizes the information according the default settings or user preferences, and then presents the formatted information on display unit 212.

Figure 4:
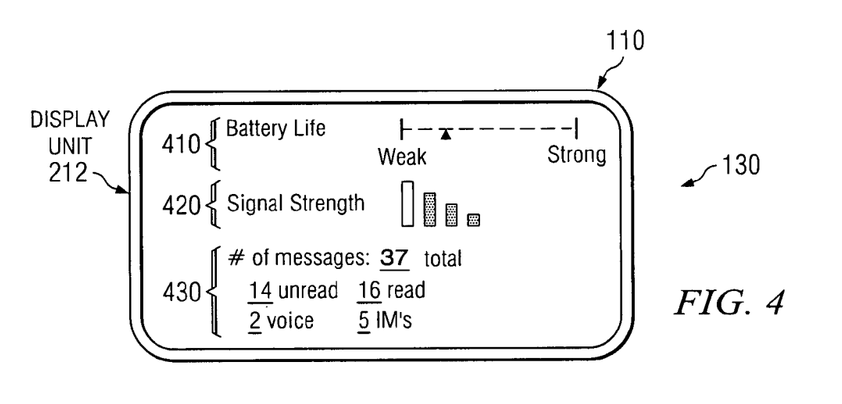
FIG. 4 illustrates an embodiment of a removable secondary display module aggregating data for a single electronic device.

FIG. 4 illustrates an embodiment of removable secondary display module 110 aggregating data for cellular telephone 130. Display unit 212 is a graphical user interface (GUI) that presents three subsets of information: a battery life 410, a signal strength 420, and a number of messages 430. In the illustrative embodiment, display unit 212 represents battery life 410 as a scale ranging from "weak" to "strong". Signal strength 420 represents the strength of connectivity or the electric field received by a electronic device. Number of messages 430 summarizes the total number of messages.

Figure 5A:
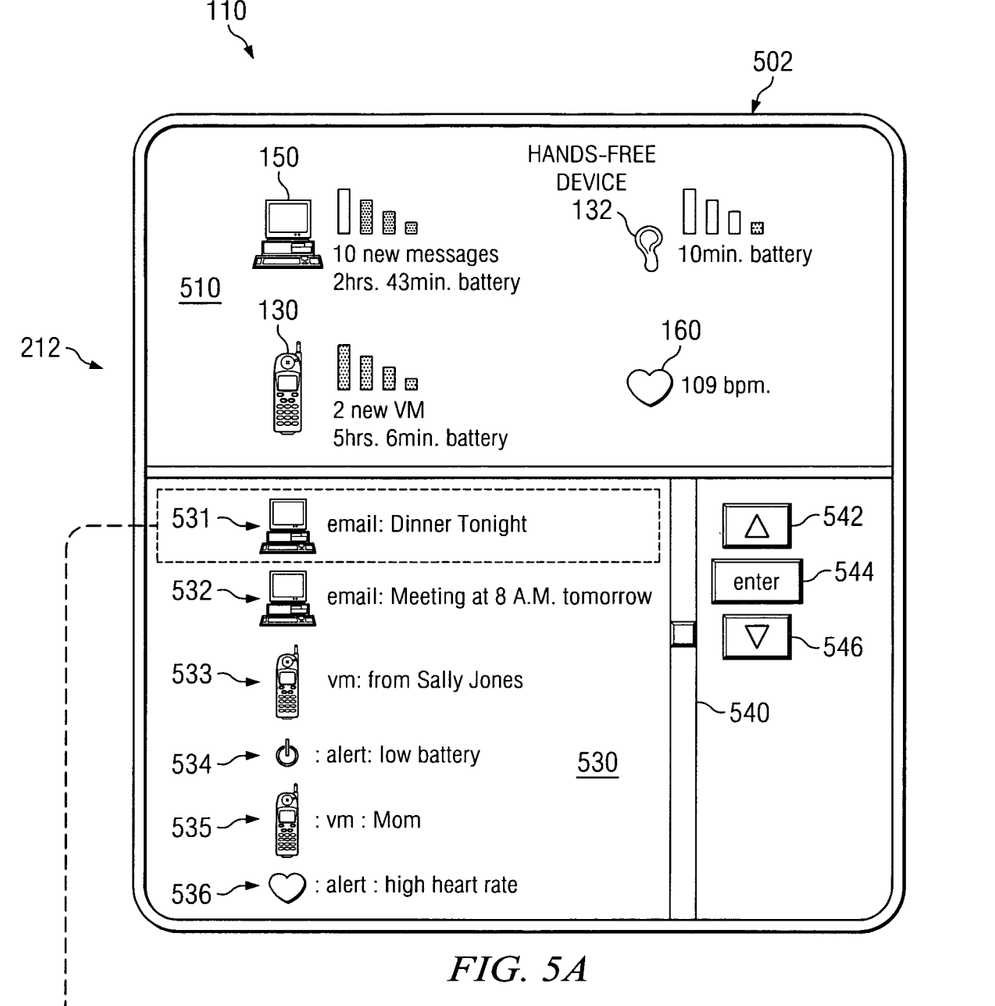
FIGS. 5A and 5B illustrate an embodiment of a removable secondary display module aggregating data for a plurality of electronic devices.
Figure 5B:
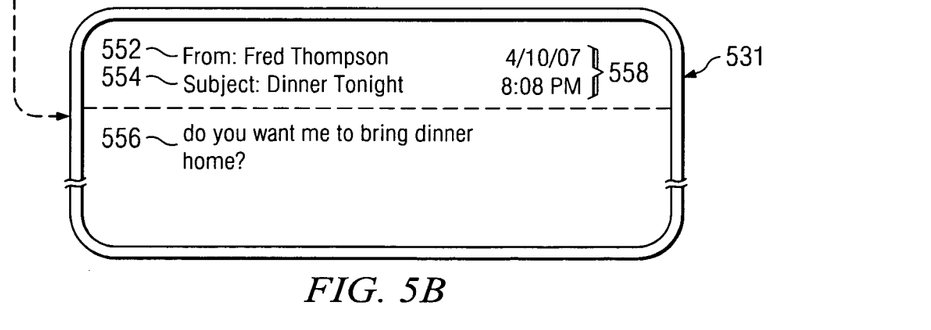

FIGS. 5A and 5B illustrate an embodiment of removable secondary display module 110 aggregating data for electronic devices 100, specifically cellular telephone 130, hands-free device 132, desktop computer 150, and heart monitor 170. It should be noted that display module 210 may present any information from any electronic device 100. It should also be noted that display module 210 may present and organize information in any format.

Display unit 212 comprises a GUI 502 and an email message 531. GUI 502 comprises a device summary section 510 and a message summary section 530. Device summary section 510 illustrates the electronic devices 100 from which information is collected and/or aggregated, such as the information for cellular telephone 130, hands-free device 132, desktop computer 150, and heart monitor 170. Since cellular telephone 130 is a proxy to hands-free device 132, the information presented in display unit 212 is provided by cellular telephone 130 (FIG. 1).

Message summary section 530 lists all the messages for all the electronic devices illustrated in device summary section 510. A message, in the illustrative embodiment, can be any type of notification relating to one of the electronic devices. Thus, a message can be, for example, an email message, an instant message, a voicemail message, a text message, or an alert. An alert is a notification which may require immediate action by the user. An alert can be a message regarding an operating parameter of the electronic device. An alert can also be a headline, such as notification of a car accident or adverse weather.

Message summary section 530 comprises messages 531 through 536. Each message comprises a graphical icon, a type of message, and a subject line. The graphical icon for each message indicates from which electronic device the particular message originated. However, it should be noted that the graphical icon for messages 531 through 536 can be illustrated in any format and/or presented as text. In the illustrative embodiment, message summary section 530 lists the messages in time order, with the top message being the most recently received message. Alternative embodiments may list the messages in a different order, such as grouping the messages by the particular electronic devices 100.

Message summary section 530 also comprises several user interface buttons that allow the user to interface with display unit 500. A scroll bar 540 enables the user to scroll through the messages in message summary section 530. An up button 542 and a down button 546 enables the user to individually select the preceding or subsequent message, respectively. Enter button 544 enables the user to select and view a specific message listed in message summary section 530. In the illustrative embodiment, message 531 is selected in message summary section 530. The details of message 531 is illustrated below GUI 502.

Figure 6:
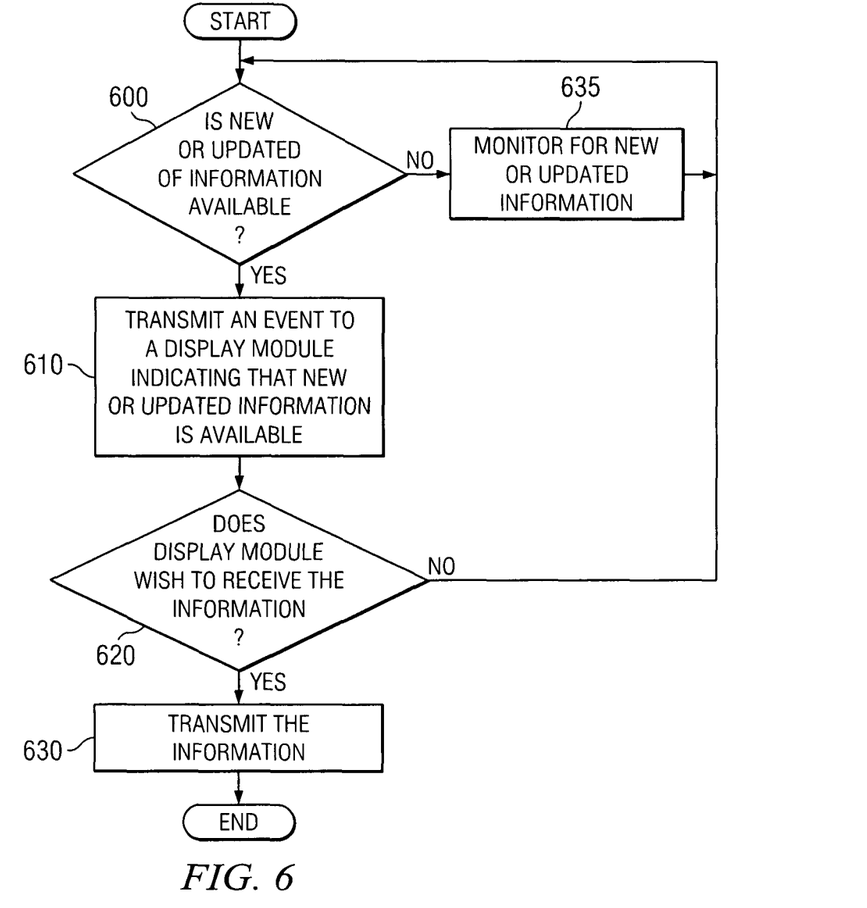
FIG. 6 is a flowchart illustrating an embodiment of a method of transmitting information by an electronic device.

FIG. 6 is a flowchart illustrating an embodiment of a method of transmitting information by electronic devices 100. The method begins at decision block 600 with electronic devices 100 determining whether new and/or updated information is available from electronic devices 100. If new and/or updated information is available ("yes" output to block 600), electronic devices 100 then transmit an event to removable secondary display module 110 indicating that new and/or updated information is available (block 610). Instead of initiating an event, in an alternative embodiment, electronic devices 100 can wait until removable secondary display module 110 polls electronic devices 100 for the information.

Electronic devices 100 then determine whether removable secondary display module 110 wishes to receive the information (block 620). If removable secondary display module 110 wishes to receive the information ("yes" output to block 620), then electronic devices 100 transmits the information to removable secondary display module 110 (block 630), with the method terminating thereafter.

At block 270, if removable secondary display module 110 does not wish to receive the information ("no" output to block 270), then the method returns to block 600. At block 600, if electronic devices 100 do not have new and/or updated information ("no" output to block 600), then electronic devices 100 continue to monitor for new and/or updated information (block 635), with the method then repeating with decision block 600.

Figure 7:
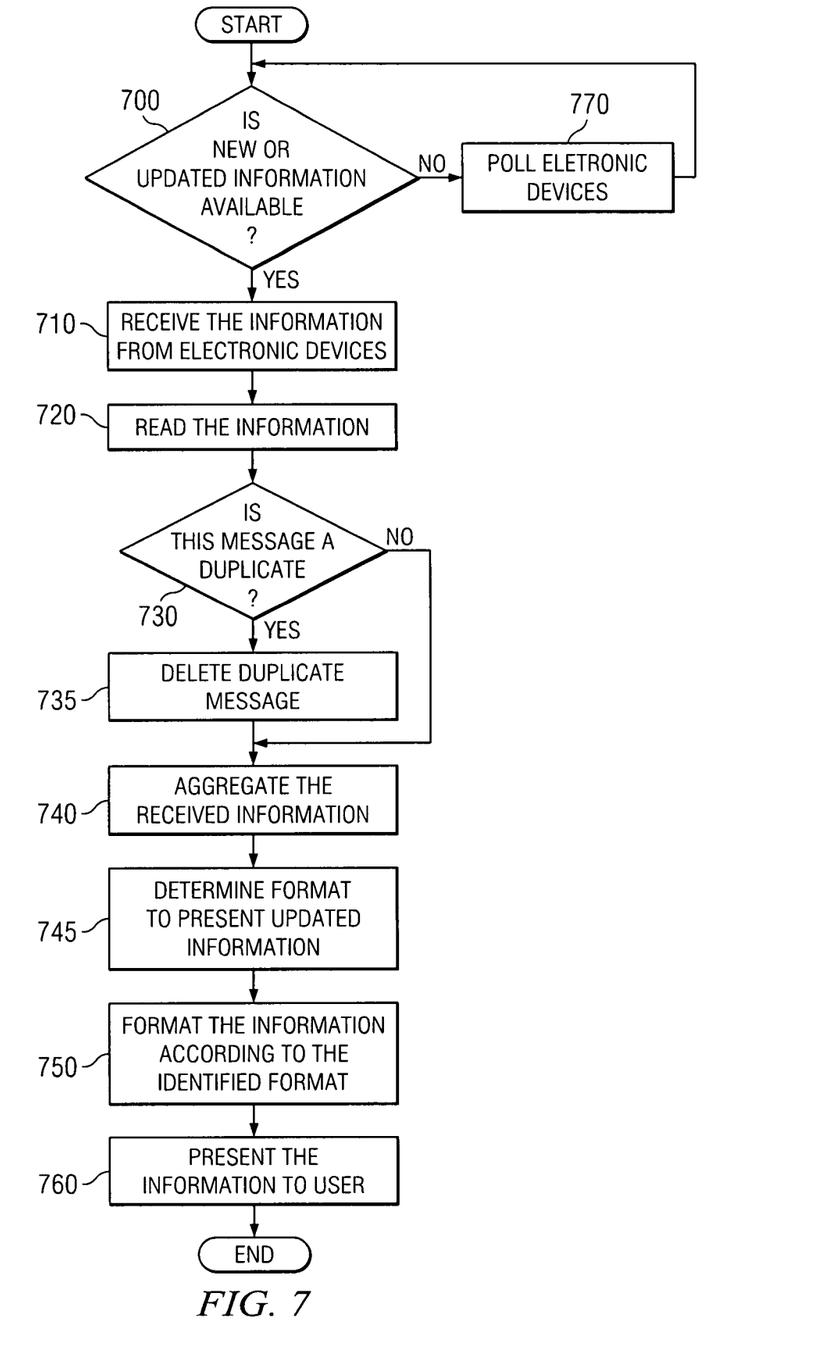
FIG. 7 is a flow chart illustrating an embodiment of a method of presenting information on a removable secondary display module.

FIG. 7 is a flow chart illustrating an embodiment of a method of presenting display information on removable secondary display module 110. The method begins at decision block 700 with removable secondary display module 110 determining whether new and/or updated information is available. Removable secondary display module 110 can either poll electronic devices 100 for the information or receive an event from the at least one electronic device indicating that the information is available. If new and/or updated information is available ("yes" output to block 700), then removable secondary display module 110 receives the information from electronic devices 100 (block 710). Removable secondary display module 110 then reads the data tags and subject line of the information (block 720). Removable secondary display module 110 then determines whether a duplicate message exists (block 730). If a duplicate message exists ("yes" output to block 730), removable secondary display module 110 deletes the duplicate message (block 735) and proceeds to block 740.

At block 730, if a duplicate message does not exist ("no" output to block 730), removable secondary display module 110 aggregates the received information (block 740). Removable secondary display module 110 then determines the format to present the updated information (block 745). In response to identifying the format, removable secondary display module 110 formats the information (block 750) and then sends the information to removable secondary display module 110 to be presented to the user (block 760). The method terminates thereafter.

At block 700, if no new and/or updated information is available ("no" output to block 700), removable secondary display module 110 then one or more polls electronic devices 100 (block 770). The method then repeats with block 700.

Embodiments may be implemented in software and can be adapted to run on different platforms and operating systems. In particular, functions implemented by removable secondary display module 110, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semiconductor system, apparatus, device, or propagation medium.

Thus illustrative embodiments provide an apparatus, a method, and a computer-usable program product for presenting information to a user. Removable secondary display module 110 is small and easy to carry around. Furthermore, removable secondary display module 110 is configurable to easily fit a variety of different types of electronic devices 100. In addition, removable secondary display module 110 consolidates all the information from a variety of different electronic devices 100 into one device, and, in some embodiments, condenses such information for viewing by a user.

What is claimed is:

1. An electronic device, comprising:
    a first display forming part of the electronic device; and
    a second display forming part of the electronic device,
    wherein the electronic device comprises a first electronic device of a plurality of electronic devices, wherein the second display is removable from engagement with the first electronic device and dockable in engagement with a second electronic device of the plurality of electronic devices, and wherein the second display is visible to a user and aggregates and displays information received from the plurality of electronic devices while docked in engagement with one of the plurality of electronic devices.

2. The electronic device of claim 1, wherein the first electronic device is a first type of electronic device, and the second electronic device is a second type of electronic device.

3. The electronic device of claim 1, wherein the second display converts the information to a common format.

4. The electronic device of claim 1, wherein the second display receives the information wirelessly from the plurality of electronic devices.

5. The electronic device of claim 1, wherein at least one of the plurality of electronic devices acts as a proxy for the second display.

6. The electronic device of claim 5, wherein the second display receives and transmits information via the at least one of the plurality of electronic devices acting as the proxy.

7. The electronic device of claim 1, wherein the second display polls at least one of the plurality of electronic devices for the information.

8. Previously Presented) The electronic device of claim 1, wherein the second display receives an event indicating that information is available from at least one of the plurality of electronic devices.

9. The electronic device of claim 1, wherein the second display deletes duplicate information received from the plurality of electronic devices.

10. The electronic device of claim 1, wherein the plurality of electronic devices are selected from a personal digital assistant, a laptop computer, a desktop computer, a CD player, an MP3 player, a heart monitor, and a cellular telephone.

11. The electronic device of claim 1, wherein the second display is configured to engage at least one of a wrist device, a key fob, a dock, a housing cavity, and a reader.

12. A method for presenting information, comprising:
    aggregating, by an onboard display of an electronic device, information received from a plurality of electronic devices while docked in physical contact with the electronic device; and
    presenting the information on the onboard display, wherein the onboard display is removable from physical contact with the electronic device, dockable in physical contact with another electronic device of the plurality of electronic devices, and visible to a user while docked in physical contact with each of the electronic device and the another electronic device.

13. The method of claim 12, wherein the onboard display is one of a plurality of onboard displays for the electronic device.

14. The method of claim 12, further comprising converting received information to a common format.

15. The method of claim 12, further comprising receiving the information wirelessly from at least one of the plurality of electronic devices.

16. The method of claim 12, further comprising polling at least one of the plurality of electronic devices for the information.

17. The method of claim 12, further comprising:
    receiving an event indicating that information is available from at least one of the plurality of electronic devices; and
    responsive to receiving the event, transmitting a request for the information from the at least one of the plurality of electronic devices.

18. The method of claim 12, further comprising, responsive to finding duplicate information received from the plurality of electronic devices, deleting one copy of the duplicate information.

19. A display module, comprising:
    a housing having a display unit, the housing communicatively coupled with and physically interchanged with a plurality of different types of electronic devices to enable the display module to be an on-board display for each of the respective plurality of different types of electronic devices whereby the display module is physically connected with a first type of electronic device of the plurality, physically disconnected from the first type of electronic device of the plurality, and physically connected with a second type of electronic device of the plurality,
    wherein, while the display module is communicatively coupled with and physically connected with one of the plurality of different types of electronic devices, the display module is visible to a user and aggregates and displays information received from the plurality of different types of electronic devices.

20. The display module of claim 19, wherein the display module recharges a battery disposed within the display module when the display module is communicatively coupled with and physically connected with one of the plurality of different types of electronic devices.

21. The display module of claim 19, wherein the plurality of different types of electronic devices comprises at least one of a personal digital assistant, a laptop computer, a desktop computer, a CD player, an MP3 player, a heart monitor, a cellular phone, a wrist device, a key fob, and a reader.

22. The electronic device of claim 1, wherein the second display includes a graphical user interface (GUI) comprising a device summary section and a message summary section, wherein the device summary section illustrates the plurality of electronic devices from which information is collected, and the message summary section illustrates information for the plurality of electronic devices.

23. The display module of claim 19, wherein the display unit of the display module includes a graphical user interface (GUI) comprising a device summary section and a message summary section, wherein the device summary section illustrates the plurality of different types of electronic devices from which information is collected, and the message summary section illustrates information for the plurality of different types of electronic devices.

24. The method of claim 12, further comprising illustrating the plurality of electronic devices from which information is collected in a device summary section of a graphical user interface (GUI) of the onboard display, and illustrating information for the plurality of electronic devices in a message summary section of the graphical user interface (GUI) of the onboard display.

* * * * *